United States Patent
Hitchen et al.

(10) Patent No.: US 7,725,490 B2
(45) Date of Patent: May 25, 2010

(54) COLLABORATIVE FILE ACCESS MANAGEMENT SYSTEM

(75) Inventors: Stephen M. Hitchen, Benton (GB); Paul Battersby, Eastfield Green (GB)

(73) Assignee: Crucian Global Services, Inc., Danville, CA (US)

( * ) Notice: Subject to any disclaimer, the term of this patent is extended or adjusted under 35 U.S.C. 154(b) by 1672 days.

(21) Appl. No.: 09/992,582

(22) Filed: Nov. 16, 2001

(65) Prior Publication Data
US 2003/0105734 A1   Jun. 5, 2003

(51) Int. Cl.
*G06F 21/00* (2006.01)
(52) U.S. Cl. ........................... 707/783
(58) Field of Classification Search .......... 707/9, 707/10
See application file for complete search history.

(56) References Cited

U.S. PATENT DOCUMENTS

| | | | | |
|---|---|---|---|---|
| 4,135,240 | A | * | 1/1979 | Ritchie ............. 711/164 |
| 4,203,166 | A | | 5/1980 | Ehrsam et al. ............. 375/2 |
| 4,796,220 | A | | 1/1989 | Wolfe ............. 364/900 |
| 5,052,040 | A | * | 9/1991 | Preston et al. ............. 713/165 |
| 5,113,442 | A | * | 5/1992 | Moir ............. 713/167 |
| 5,291,405 | A | * | 3/1994 | Kohari ............. 715/500 |
| 5,313,646 | A | | 5/1994 | Hendricks et al. ............. 395/600 |
| 5,542,045 | A | | 7/1996 | Levine ............. 395/186 |
| 5,629,980 | A | * | 5/1997 | Stefik et al. ............. 705/54 |
| 5,689,560 | A | | 11/1997 | Cooper et al. ............. 380/4 |
| 5,715,403 | A | * | 2/1998 | Stefik ............. 705/44 |
| 5,724,578 | A | * | 3/1998 | Morinaga et al. ............. 707/100 |
| 5,778,365 | A | * | 7/1998 | Nishiyama ............. 707/9 |
| 5,796,825 | A | * | 8/1998 | McDonnal et al. ............. 713/165 |
| 5,819,089 | A | * | 10/1998 | White ............. 718/106 |
| 5,832,274 | A | | 11/1998 | Cutler et al. ............. 395/712 |
| 5,910,987 | A | * | 6/1999 | Ginter et al. ............. 705/52 |
| 5,925,126 | A | * | 7/1999 | Hsieh ............. 713/200 |
| 5,974,549 | A | * | 10/1999 | Golan ............. 713/200 |

(Continued)

FOREIGN PATENT DOCUMENTS

GB    2295909 A  *  6/1995

(Continued)

OTHER PUBLICATIONS

Dourish, P. et al. "Extending Document Management Systems with User-Specific Active Properties", Xerox PARC Working Paper, 1999, to appear in ACM Transactions on Information Systems, vol. 18, No. 2, pp. 140-170, 2000.*

(Continued)

*Primary Examiner*—Luke S Wassum
(74) *Attorney, Agent, or Firm*—Steven M. Greenberg, Esq.; Carey, Rodriguez, Greenberg & Paul, LLP

(57) ABSTRACT

A collaborative file access management system. The system can include one or more secure, collaborative files, each secure, collaborative file including a security trailer specifying at least one of an access policy and associated digital rights. The system also can include a user-layer file management application configured to limit access to the secure, collaborative file based upon the access policy. Finally, the system can include a kernel-layer file security service configured both to detect kernel-level requests to access the secure, collaborative files, and also, responsive to the detected kernel-level requests, to invoke the file management application.

15 Claims, 3 Drawing Sheets

U.S. PATENT DOCUMENTS

| | | | | |
|---|---|---|---|---|
| 5,991,778 | A | | 11/1999 | Starek et al. ............... 707/205 |
| 6,006,332 | A | * | 12/1999 | Rabne et al. .................. 726/6 |
| 6,026,402 | A | * | 2/2000 | Vossen et al. ................. 707/9 |
| 6,044,469 | A | | 3/2000 | Horstmann ................. 713/201 |
| 6,052,780 | A | * | 4/2000 | Glover ....................... 713/193 |
| 6,061,726 | A | | 5/2000 | Cook et al. ................. 709/226 |
| 6,070,174 | A | | 5/2000 | Starek et al. ............... 707/206 |
| 6,088,801 | A | | 7/2000 | Grecsek ...................... 713/200 |
| 6,105,069 | A | | 8/2000 | Franklin et al. ............ 709/229 |
| 6,185,681 | B1 | * | 2/2001 | Zizzi .......................... 713/165 |
| 6,212,600 | B1 | | 4/2001 | Friedman et al. ........... 711/112 |
| 6,253,217 | B1 | * | 6/2001 | Dourish et al. ............. 715/500 |
| 6,256,646 | B1 | | 7/2001 | Starek et al. ............... 707/205 |
| 6,289,450 | B1 | * | 9/2001 | Pensak et al. ............... 713/167 |
| 6,308,179 | B1 | * | 10/2001 | Petersen et al. ............ 707/102 |
| 6,314,437 | B1 | * | 11/2001 | Starek et al. ............... 707/206 |
| 6,324,551 | B1 | * | 11/2001 | Lamping et al. ........... 715/500 |
| 6,339,825 | B2 | * | 1/2002 | Pensak et al. ............... 713/158 |
| 6,449,652 | B1 | * | 9/2002 | Blumenau et al. .......... 709/229 |
| 6,449,721 | B1 | * | 9/2002 | Pensak et al. ............... 713/171 |
| 6,553,466 | B1 | * | 4/2003 | Friedman et al. ........... 711/152 |
| 6,658,571 | B1 | * | 12/2003 | O'Brien et al. ............. 713/200 |
| 6,671,805 | B1 | * | 12/2003 | Brown et al. ............... 713/176 |
| 6,891,953 | B1 | * | 5/2005 | DeMello et al. ............ 380/277 |
| 2002/0035697 | A1 | * | 3/2002 | McCurdy et al. ........... 713/200 |
| 2002/0109707 | A1 | * | 8/2002 | Lao et al. .................... 345/700 |
| 2002/0178271 | A1 | * | 11/2002 | Graham et al. ............. 709/229 |
| 2003/0196114 | A1 | * | 10/2003 | Brew et al. ................. 713/201 |
| 2003/0200459 | A1 | * | 10/2003 | Seeman ...................... 713/200 |
| 2003/0237005 | A1 | * | 12/2003 | Bar-Or et al. ............... 713/201 |

FOREIGN PATENT DOCUMENTS

| | | |
|---|---|---|
| WO | WO 01/25925 A1 * | 4/2001 |
| WO | WO 01/25928 A1 * | 4/2001 |
| WO | WO 01/25932 A1 * | 4/2001 |
| WO | WO 01/25937 A1 * | 4/2001 |
| WO | WO 01/25953 A1 * | 4/2001 |
| WO | WO 01/26276 A1 * | 4/2001 |
| WO | WO 01/26277 A1 * | 4/2001 |
| WO | WO-02/103536 A1 * | 12/2002 |

OTHER PUBLICATIONS

Infraworks Corporation "Solutions for File Protection", white paper, downloaded from www.infraworks.com, Sep. 2001.*

DeMarines, V. "Content Security for the Enterprise", white paper, downloaded from www.authentica.com, Apr. 2, 2002.*

Dourish, P. "The Appropriation of Interactive Technologies: Some Lessons from Placeless Documents", Department of Information and Computer Science, University of California Irvine, 2002.*

DeMarines, V. "IP on the Move: Protecting Intellectual Property in a Competitive Environment", white paper, downloaded from www.authentica.com, Nov. 2003.*

Infraworks Corporation "InTether™ Server", product brochure, undated.*

Infraworks Corporation "InTether™ Desktop", product brochure, undated.*

Adhaero Technologies "Adhaero Doc Technical Overview", white paper, undated, downloaded from www.adhaero.com.*

Adhaero Technologies "Business Document Security with Adhaero Doc", white paper, undated, downloaded from www.adhaero.com.*

Stefik, M. And A. Silverman "The Bit and the Pendulum", Xerox PARC, downloaded from http://www.contentguard.com/whitepapers/Pendulum97Jul29.pdf, 1997.*

Hughes, J. et al. "A Universal Access, Smart-Card-Based, Secure File System", Atlanta Linux Showcase, Oct. 12, 1999.*

Disclosure of Abandoned U.S. Appl. No. 09/717,474, Nov. 20, 2000.*

Hughes, J.P. and C.J. Feist "Architecture of the Secure File System", Proceedings of the 18th IEEE Symposium on Mass Storage Systems, Apr. 17-21, 2001.*

Cowley, S. and P. Roberts "Microsoft Details New Rights Management Technology", Computerworld, Feb. 21, 2003.*

Yu, Y. and T-C Chiueh "Enterprise Digital Rights Management: Solutions Against Information Theft by Insiders", Experimental Computer Science Lab, Computer Science Dept., Stony Brook Univ., downloaded from www.ecsl.cs.sunysb.edu/tr/TR169.pdf, Sep. 2004.*

ContentGuard "ContentGuard Patent Licensing Options", downloaded from www.contentguard.com/patents.asp, Oct. 14, 2005.*

Mauriello, E., *TCFS: Transparent Cryptographic File System, A Description of How the TCFS Secure File System Works and Why You Should Use It*, <http://www2.linuxjournal.com/lj-issues/issue40/2174.html>, (Oct. 12, 2001).

*WinVista e-OPI*, Enterprise Management Associates Product Brief, pp. 1-2, (Dec. 2000).

E-World: New Technology Helps Protect Data Let Loose on the Internet, *The Wall Street Journal Marketplace*, Dow Jones Reference Services, <http://webreprints.djreprints.com/000000000000000002176001.html> (Oct. 12, 2001).

Tucker, M.J., *Security at the Document Level: A Profile of Authentica*, <http://www.messageq.com/security/tucker_3.html>, (Oct. 12, 2001).

Gibbs, M., Oct. 1, 2001—Today's Focus: Document Control Freak, *Network World Newsletter: Mark Gibbs on Web Applications*, <http://www.authentica.com/newsandevents/presscoverage/nwfusion.html>, (Oct. 12, 2001).

Take Total Control of Your Documents, *Authentica PageRecall*, Authentica, Inc. (2001).

*Take Control of the Valuable Digital Information You Share Over the 'Net*, Authentica, Inc., <http://www.authentica.com/>, (Oct. 12, 2001).

*Products—Infraworks Suite of Products*, Infraworks, Corp., <http://www.infraworks.com/products.html>, (Oct. 12, 2001).

* cited by examiner

COLLABORATIVE FILE ACCESS MANAGEMENT SYSTEM

BACKGROUND OF THE INVENTION

1. Statement of the Technical Field

The present invention relates to the field of file security and digital rights management, and more particularly to methods and systems for transparently protecting, controlling and managing files in a collaborative environment.

2. Description of the Related Art

Prior to the advent of the information age, protecting sensitive files seemed simple—limit the number of hard copies and secure existing hard copies under lock and key. The digital revolution, however, has eased the manner in which files can be shared amongst a vast audience resulting in the inability of authors to limit the number of copies made of an electronic file and the associated distribution of those electronic files. In consequence, financial losses attributable to the misappropriation of sensitive electronic files are increasing each day.

Virtually every business supporting electronic data interchange and e-business faces the threat of cybercrime. A breach in security of an Internet credit card transaction, or the distribution of confidential files by dishonest employees may result in devastating losses to the company. United States legislation has addressed cybercrime in the Computer Fraud and Abuse Act of 1986, in which it is a felony to obtain information to which a person is not entitled through the unauthorized access or exceeded authorization. Still, nationwide United States Attorneys have been slow to prosecute those corporate insiders who violate the Computer Fraud and Abuse Act of 1986.

Whether facilitated by dishonest or merely careless employees, the misappropriation and compromise of sensitive files has caused significant disruptions among businesses in the global business community. Notwithstanding, corporate insiders operating as professional thieves can be even more elusive than and destructive than merely dishonest or careless employees. Many studies have concluded that competitors, disgruntled employees and independent hackers alike are intent upon stealing sensitive corporate information at any opportunity.

Government agencies, law firms, investment banks, accounting and auditing firms and engineering organizations are particularly sensitive to the unauthorized appropriation of sensitive data. In particular, it is of paramount concern to protect the contents of electronic versions of legal agreements, proposals, functional and technical specifications and technical drawings. Yet, many have a tendency to ignore threats to sensitive data until after the sensitive data has been misappropriated.

Tampering or theft of sensitive files is not the only concern for those who manage files in the enterprise. Business electronic mail (e-mail) usage continues to grow at an astounding rate. It is clear that e-mail has become a critical mode of inter and intra-business communications. Nevertheless, every transmitted e-mail and corresponding e-mail attachment can result in an unintentional breach of security. In particular, when a party other than the intended recipient of the e-mail accesses the e-mail, the intent of a secure transaction has been lost.

Several products have been developed in recent times to address the problem of securing files from unintentional or malicious misappropriation. For example, Authentica, Inc. of Waltham, Mass. (Authentica) has developed a system for securing sensitive electronic files, even after those sensitive files have been distributed to selected recipients. More particularly, in the Authentica system sensitive files can be encrypted and access policies including digital rights applied thereto prior to transmitting the file to a recipient.

Once an encrypted file has been received, the recipient can access a central server to assist the recipient in decrypting the encrypted file. Of course, the server also can ensure that the recipient has access privileges which satisfy the access policies of the sensitive file. Finally, the digital rights included with the encrypted file can ensure that the recipient does not exceed the recipient's authority to modify or further distribute the sensitive file.

Still, inasmuch as the Authentica solution is a client/server solution, the Authentica system requires that the recipient maintain a network connection to the central server when the recipient attempts to access an encrypted file. Thus, the Authentica system lacks flexibility. Furthermore, the Authentica solution is not transparent in that accessing a file protected using the Authentica system requires substantial user interaction and the deployment of a separate application. Specifically, to enforce the digital rights associated with a protected file, for example whether a user can modify, copy, or print the file, the Authentica system utilizes a separate file viewer. The use of a separate file viewer, however, can inhibit the transparency necessary to conduct effective file collaboration.

Infraworks Corporation of Austin, Tex., by comparison, has developed a server-independent solution in which file security can be managed by a client-side plug-in containing all necessary logic to control access to an attached file. Developed to specifically address the security of e-mail distributed files, the Infraworks solution, however, lacks the ability to secure collaborative files which are not necessarily distributed via e-mail. For instance, the Infraworks solution cannot secure a collaborative file accessed over a network through the conventional file-open dialog box of a word-processor. Moreover, the Infraworks solution, like the Authentica solution, lacks the transparency required to effectively promote file collaboration.

Importantly, file collaboration has become an important element of inter and intra-business activities. Specifically, it has become a common occurrence for corporate competitors to intentionally collaborate with one another using commonly accessible files, despite the sensitivity of the contents of those files. In fact, in many cases competitors and corporate partners alike exchange sensitive files via e-mail and e-mail attachments. File collaboration also can result in the unintentional modification or destruction of a commonly shared file. In particular, in the collaborative environment, it is not uncommon for collaborators to accidentally lose or destroy electronic files.

In many cases, those who would engage in file collaboration may do so in the presence or absence of network facilities. Specifically, often it can be desirable to access a secure file while disengaged from a network, such as while traveling or while at home. In consequence, in a collaborative environment, those who intentionally disseminate sensitive data also must track and enforce limitations on the use and further dissemination of the sensitive data, regardless of the availability of a centralized server configured to control such limitations on the use and further dissemination of the sensitive data. Furthermore, the enforcement of such limitations must occur transparently so as to promote effective, yet seamless file collaboration.

SUMMARY OF THE INVENTION

The present invention is a novel and non-obvious method and system for securing access to collaborative files which overcomes the deficiencies of the prior art. Specifically, unlike some prior art file access systems, in the system and method of the present invention, file access and digital rights can be managed transparently and automatically from within an authoring application, rather than through a third-party application. Additionally, unlike other prior art file access systems, in the system and method of the present invention, file access management can be based upon an access policy and digital rights appended to the file itself rather than an access policy or digital rights specified by an external computing service such as a central application server.

In one aspect of the present invention, a collaborative file rights management method can be provided which can include the steps of identifying a file input/output (I/O) request to access a file, the file I/O request originating in an authoring application; suppressing the file I/O request; automatically extracting digital rights management data appended to the file; providing the file to the authoring application; and, managing access to the file in the authoring application based upon the extracted digital rights management data. Additionally, the collaborative file rights management method can include the step of decrypting the file.

The extracting step can include the step of determining environmental data associated with the file I/O request, the environmental data including at least one of a requestor's identity, a requestor's class, a requestor's computing domain, a requestor's location, a password, a time of day, and a date. Also, the extracting step can include the step of extracting an access policy appended to the file. As a result, the providing step can include the steps of comparing the access policy to at least a portion of the environmental data; authenticating the file I/O request based upon the comparison; and, providing the file to the authoring application only if the file I/O request has been authenticated.

Notably, the suppressing step can include posting a responsive message to the authoring application; intercepting an operating system event in the authoring application, the operating system event indicating receipt of the responsive message; and, quashing further processing of the intercepted operating system event. Also, the identifying step can include monitoring kernel-level file I/O requests contained in I/O request packets processed in a file system manager; and, detecting the file I/O request to access the file in one of the I/O request packets.

The management step can include intercepting operating system messages in the authoring application; detecting among the intercepted operating system messages, operating system messages directed to authoring application operations which can be limited according to digital rights specified in the extracted digital rights management data; and, quashing the detected events where the digital rights management data prohibits execution of the authoring application operations. In particular, the authoring application operations can include operations selected from the group consisting of clipboard operations, printing operations, file saving operations, and file editing operations.

A collaborative file rights management method also can include identifying a file input/output (I/O) request to save a file, the request originating in an authoring application; suppressing the request and automatically encrypting the file using a locally available encryption key; appending digital rights management data to the encrypted file; and, storing the file in fixed storage. The suppressing step can include posting a responsive message to the authoring application; intercepting an operating system event in the authoring application, the operating system event indicating receipt of the responsive message; and, quashing further processing of the intercepted operating system event. The identifying step can include monitoring kernel-level file I/O requests contained in I/O request packets processed in a file system manager; and, detecting the file I/O request to save the file in one of the I/O request packets. Finally, the encryption step can include encrypting the file at the kernel-level.

A collaborative file rights management system also can be provided which can include a file security management application configured to intercept operating system messages directed to an authoring application; and, a file security filter driver configured to identify file input/output (I/O) requests received in a kernel-layer file system manager to open an encrypted file in the authoring application. The file security filter driver can quash the file I/O requests, decrypt the encrypted file and provide the decrypted file to the authoring application. The file security management application, by comparison, can extract digital rights management data appended to the encrypted file, detect among intercepted operating system messages, operating system messages directed to authoring application operations which can be limited according to digital rights specified in the extracted digital rights management data, and, quash the detected events where the digital rights management data prohibits execution of the authoring application operations.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
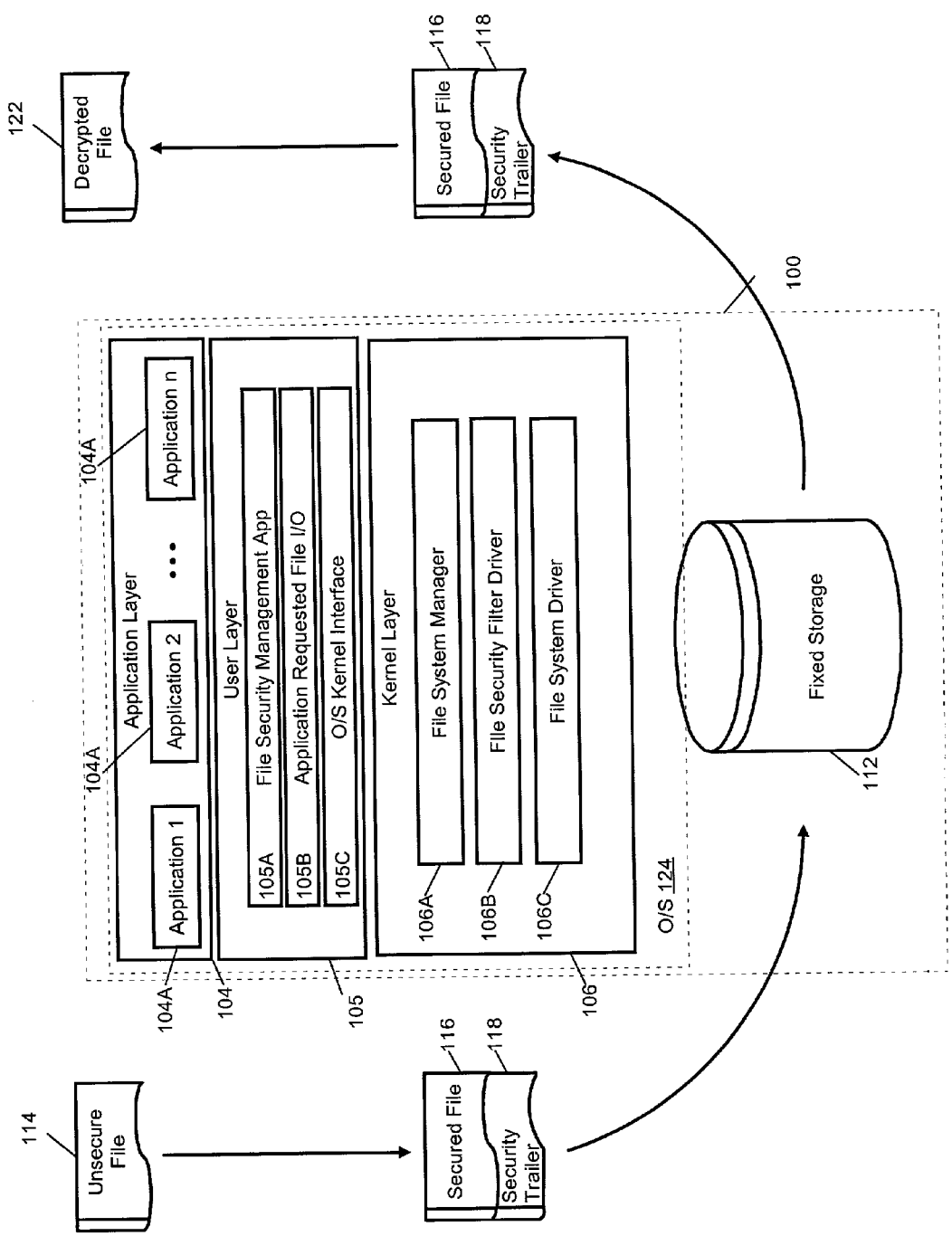
FIG. 1 is a schematic depiction of a system which has been configured to manage access to collaborative files in accordance with the inventive arrangements.

The present invention is a system and method for managing both access to and digital rights in secure files in a collaborative environment. Generally, a collaborative environment can include one or more persons sharing files across one or more computing devices such as personal computers, handheld computers, personal digital assistants and the like. When configured for use with a particular authoring application, files created using the authoring application can be securely shared with other collaborators using the same authoring application. In particular, access to an authored file can be limited according to the preferences of the file author. These limitations can include not only absolute limitations, for instance the identity of a collaborator who is permitted to access and whether collaborators can save, modify or print the file, but also intermediate limitations, for example periods of time during which collaborators can access the file.

In a preferred aspect of the present invention, collaborative files can be secured through a combination of encryption, access policy specification and digital rights management. In particular, once encrypted, the file can be associated with a digital container which specifies both the access policy pertaining to the file and digital rights managing the level of access permitted in the file. The access policy can identify the type of user or users who are permitted to access the file. The access policy also can specify a time period during which users can access the file. Still, the access policy is not limited to the examples specified herein and the access policy can include any time of access limitation which generally limits access to the file based upon the identity of the user, the contents of the file or the period when the file can or cannot be accessed.

The digital rights, by comparison, can specify those operations which can be performed on the file once a user has been granted access to the file. Digital rights can include any type of operational limitation, for example whether a user can print, save, copy, or modify the file. Notably, the digital rights can vary according to the identity or class of user, however, in a preferred aspect of the invention, digital rights can be specified by the author, or by default, independently from the access policy. Importantly, though, while in the preferred aspect of the invention a combination of encryption, access policies and digital rights can secure the distribution of a file according to the preferences of the author, the invention is not so limited to the particular application of encryption, an access policy and digital rights to each secure file. Rather, other combinations can suffice, for example a combined access policy and digital rights, but not encryption.

Importantly, files which have been secured in accordance with the inventive arrangements can be distributed without requiring collaborators to maintain network access to a centralized server in which access to the distributed files can be managed. Rather, access to secured files can be managed locally, from within the computing device in which a collaborator attempts to access the secured file. In this regard, access to each secured file can be managed according to the access policy and digital rights specified in the digital container appended to the secured file. Also, unlike prior art digital rights management systems, collaborators can access secured files transparently and seamlessly through the authoring application without requiring the collaborator to invoke third party security applications.

FIG. 1 is a schematic depiction of a computing system 100 which has been configured to manage access to collaborative files in accordance with the inventive arrangements. In the system of the invention, collaborators both can author and access collaborative files. Where an end-user authors a collaborative file, the authored, unsecured file 114 can be encrypted and digital rights can be applied thereto prior to storing the secured file 116 in fixed storage 112. By comparison, where an end-user accesses an already secured file 116 in fixed storage 112, the secured file 116 can be automatically decrypted and access thereto can be limited to those digital rights specified in association with the decrypted file 114.

In the present invention, the collaborative file both can be authored and accessed through an authoring application 104A executing in application layer 104 of the operating system 124. An authoring application can be any application suitable for creating and modifying a collaborative file. Examples of an authoring application can include, but are not limited to, a word processor, spreadsheet, an image manipulation tool, and a presentation program. Each application 104A in the application layer 104 can execute on top of a user layer 105 which can include user accessible services such as operating system event queues and the like.

In accordance with the present invention, the user layer 105 can include a file security management application 105A which can process operating system events 105B received in the user layer 105. In particular, the file security management application 105A can process requests to access a collaborative file in the authoring application 104A. Such access requests can include clipboard related requests such as cut, copy and paste requests often provided in conjunction with windowing operating systems, printing requests, and file I/O requests.

Notably, the file security management application 105A can be configured to process the access requests in a manner consistent with the digital rights encapsulated in a security trailer 118 which has been appended to a secured file 114 loaded within the authoring application 104A. For instance, where a collaborator is permitted to view a file, but is not permitted to print the file, the file security management application 105A can trap and quash print events in the authoring application 104A. By comparison, where a collaborator is permitted to print the contents of a file, but is not permitted to copy electronic portions of the file, the file security management application 105A can trap and quash the processing of clipboard copying events.

The user layer 105 can provide access to kernel layer services in the operating system 124 through an O/S kernel interface 105C. More particularly, kernel layer services can be provided within the kernel layer 106. For instance, the kernel layer 106 can include a file system driver 106C and a file system manager 106A. While the file system manager 106A can install and manage file system devices, the file system driver 106C can provide a software level interface to the firmware and mechanics of a particular storage device, such as the fixed storage 112.

In accordance with the inventive arrangements, the kernel layer 106 also can include a file security filter driver 106B. The file security filter driver 106B can be configured to monitor the file system manager 106A for incoming file I/O requests. Upon detecting an incoming file I/O request, the file security filter driver 106B can notify a file security management application 105A residing in the user layer and can determine whether the file I/O request relates to the authoring application 104A and, if the file I/O request is a read request, whether the requested file is a secured file 116. If so, the file security filter driver can authenticate the requestor according to the access policy contained in the security trailer 118.

For example, where the collaborator has been classified as a member of a group which has not been permitted to access the requested file 116, the file security filter driver 106B can deny the request. Conversely, where the collaborator enjoys access privileges specified as permissible in the access policy, the file security filter driver 116B can permit the request. Alternatively, where the collaborator is unable to present a proper authentication password, or if the collaborator has attempted to access the requested file 116 outside of the specified time period during which the requested file 116 can be accessed, the file security filter driver 106B can deny the request.

In any case, where access to the requested file 116 is granted, the file security filter driver 106B can invoke a decryption process to decrypt the requested file 116 and can provide the decrypted file 114 to the authoring application 104A in which the decrypted file 114 can be accessed according to its associated digital rights. Significantly, although each of authentication, encryption and digital rights management can be combined to implement a secure file distribution system, the invention is not so limited to the combination of authentication, encryption and digital rights management. Rather, in alternative embodiments, either or both of the authentication and encryption processes can be omitted.

Figure 2:
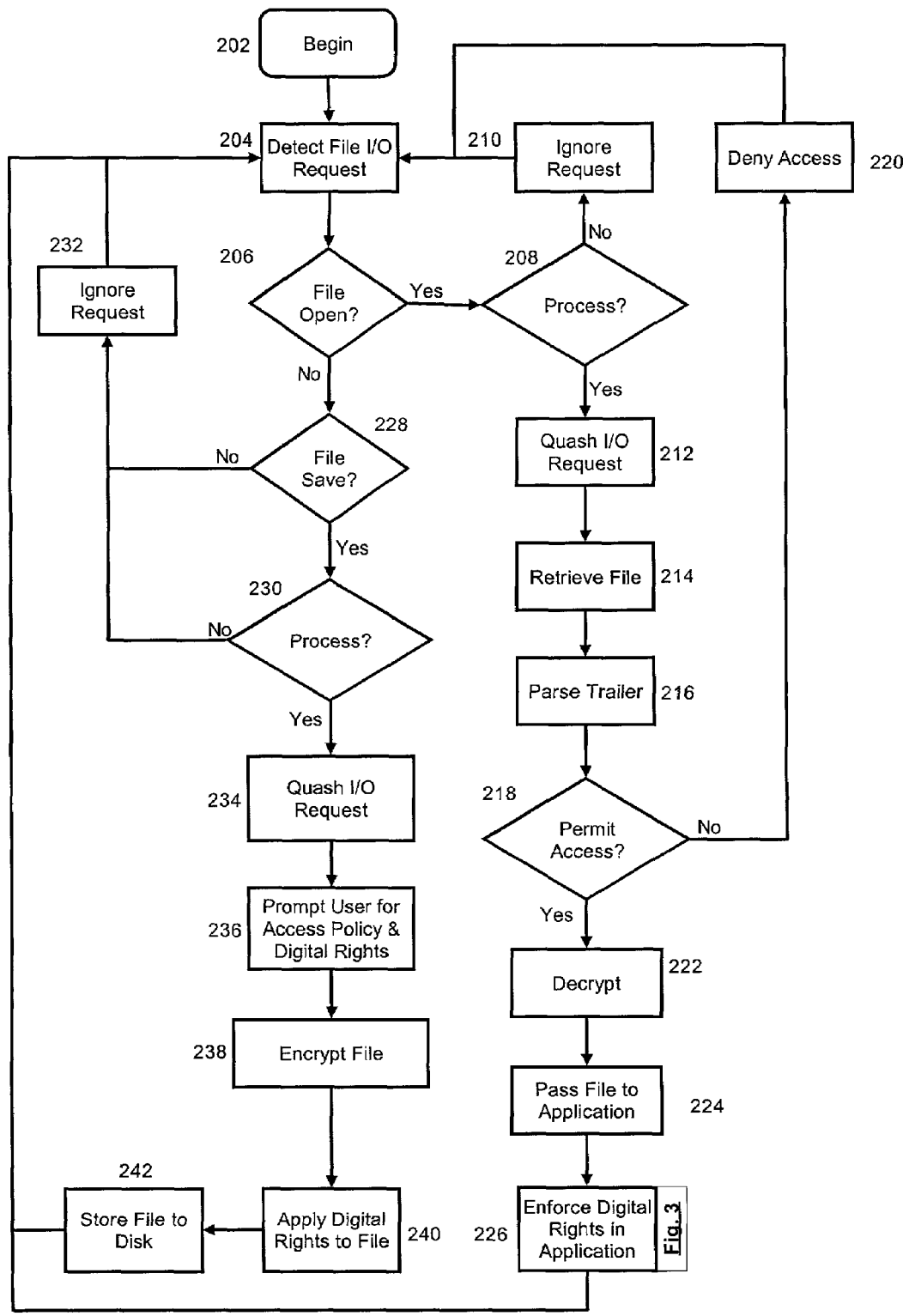
FIG. 2 is a flow chart illustrating a process for accessing a collaborative file in the system of FIG. 1; and, FIG. 3 is a flow chart illustrating a process of managing digital rights associated with a collaborative file accessed through the process of FIG. 2.

FIG. 2 is a flow chart illustrating a method for managing access to a collaborative file in the system of FIG. 1. The method can begin in block 202 leading into block 204 in which the file security filter driver disposed in the kernel can monitor kernel-level file I/O requests. If, in decision block 206, a file I/O request associated with opening and reading a file from fixed storage is detected, in decision block 208 it can be determined from the requested file whether the file can be processed by the file access management system of the present invention. For example, the file can be inspected for a security trailer containing the access policy and digital rights. If the file cannot be processed by the file access management system, in block 210, the file I/O request can be ignored and processed conventionally using the file system driver disposed in the kernel layer.

Otherwise, in block 212, the file I/O request can be quashed. Subsequently, in block 214 the requested file can be retrieved and in block 216, the security trailer can parsed in which both an access policy and digital rights associated with the file can be identified and stored. In block 218, the access environment can be compared to the stored access policy. More particularly, as the access policy can enforce access limitations to the file such as user identity, user class, user location and access times, one or more of the user's identity, class, computing domain, location and present time can be compared to the access policy to determine whether access shall be permitted. If access is impermissible, in block 220 a message can be posted to the application to notify the user that the access policy associated with the requested file does not permit access by the user at that time.

Otherwise, in block 222, the requested file can be automatically decrypted. Significantly, each of the quashing, retrieving and decrypting steps can occur in a manner which is seamless and transparent to the end user. In particular, upon the user requesting to access a secure file through the authoring application, the file security filter driver can detect the resulting kernel-level file I/O request and can post a response to the file I/O request responsive to which the authoring application can presume that the file I/O request has been completely processed. Notably, a suitable response can include an "access denied" message which can cause the authoring application to presume that the requested file could not be opened.

In any case, in a preferred aspect of the invention, the file security management application residing in the user layer of the operating system can monitor operating system events which are directed toward the authoring application. In response to detecting an "access denied" message, the file security management application can intercept and suppress any attempt by the authoring application to visually warn the user of the "access denied" condition. In this way, the interception and processing of the file I/O request in the kernel layer can have a transparent impact on the authoring application. Consequently, the user seeking to load the secure file from within the authoring application can remain unaware of the interception and decryption process.

Once the requested file has been decrypted in block 222, the decrypted file can be provided to the authoring application in block 224. Finally, in block 226, those retrieved digital rights can be enforced in the file security management application. Still, the invention is not limited in regard to the particular method by which the file I/O request is quashed, the file is retrieved and decrypted and the file is provided to the authoring application. In fact, in another aspect of the present invention, each of the quashing, suppression and decryption can occur concurrently to one another.

The method of the invention also can be applied during the save phase of authoring a collaborative file. In particular, where in decision blocks 206 and 228 it is determined that detected file I/O request is not a file-open request, but a file-save request, in decision block 230 it can be determined from the requested file whether the file can be processed by the file access management system of the present invention. If the file cannot be processed by the file access management system of the present invention, in block 232 the request can be ignored and processed conventionally using file-save kernel services.

Otherwise, in block 234 the file I/O request again can be quashed and, in block 236, the file security management application can prompt the user to select both an access policy and digital rights to be applied to the file. In particular, the user can be prompted to specify whether portions of the file can be printed, modified, or copied. Furthermore, the user can specify a time frame during which the file can be accessed by a collaborator. Finally, where desired the user can associate the specified digital rights with one or more users or class of users. Notably, different users or classes of users can have differing digital rights. In any event, as one skilled in the art will recognize, the invention is limited neither to any particular access policy or type of digital rights which can be applied to the file, nor to any method by which the user can specify those digital rights.

Once the access policy and digital rights have been specified, the file can be encrypted in block 238 and the specified access policy and digital rights can be encapsulated in a container and appended to the file in block 240. Subsequently, in block 242, the file can be stored in fixed storage. Significantly, unlike known file security technologies of the prior art, in the present invention, users can collaborate with one another using secure files produced and managed by the system of FIG. 1 without requiring the security management services of a central server. Rather, secured files can be encrypted and decrypted locally within the computing device which hosts the authoring application. Furthermore, the secured files can be encrypted and decrypted in a seamless and transparent manner to the user and the authoring application. Finally, the digital rights associated with the secured file also can be managed and enforced locally in a seamless and transparent manner from within the authoring application, while permitting collaborators to otherwise edit the secured file.

Figure 3:
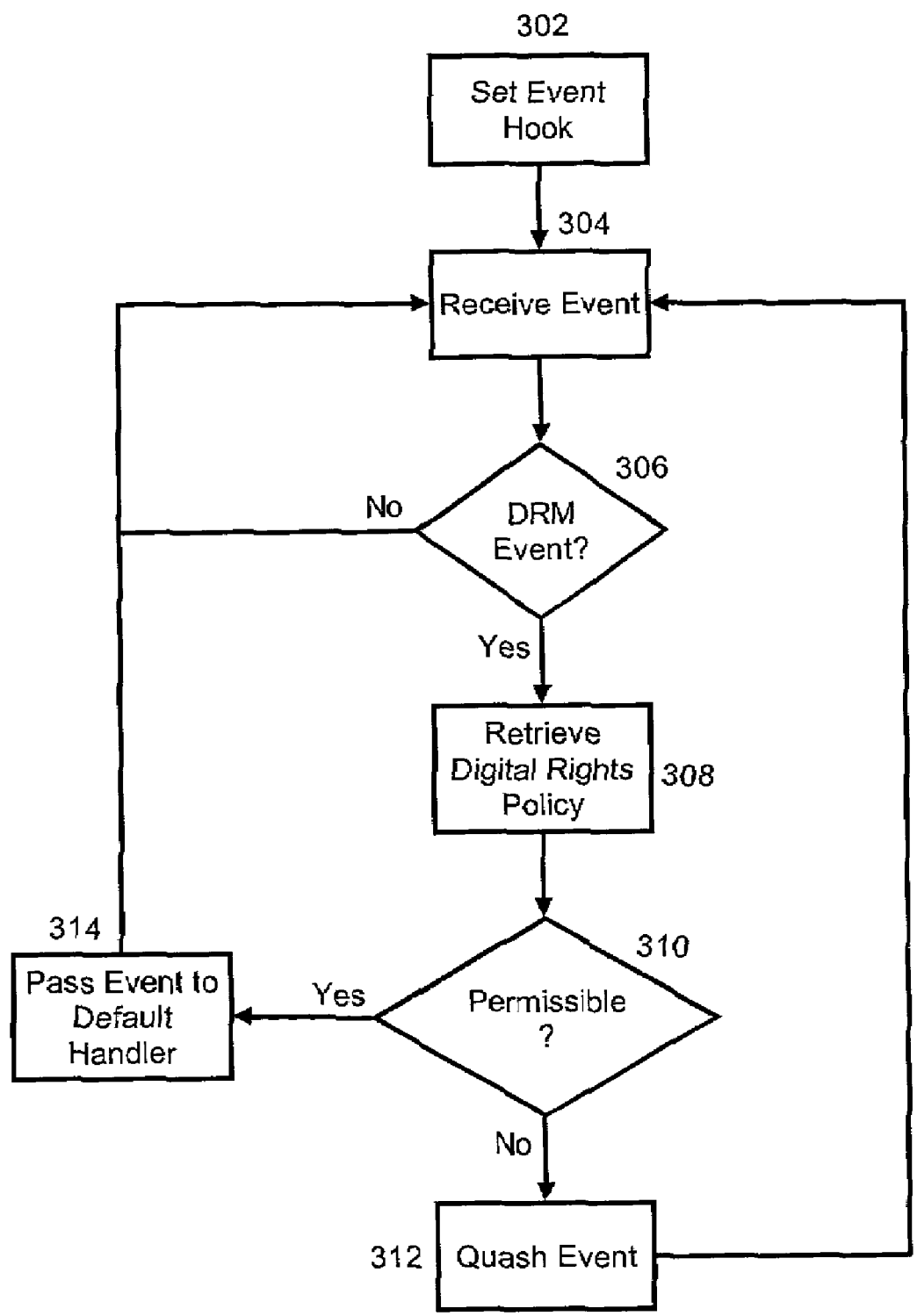

FIG. 3 is a flow chart illustrating the management of digital rights in accordance with the inventive arrangements. Beginning in block 302, the file security management application can be configured to intercept operating system messages which are directed to the authoring application. For example, the file security management application can "sub-class" the message queue of the authoring application as is well-known in the art. Once configured, in block 304, the file security management application can receive and process operating system events directed towards the authoring application.

Importantly, the file security management application can be configured to process particular operating system messages associated with restricted application operations. For instance, the file security management application can be configured to process clipboard messages, print messages, file save-as messages and the like. Hence, in block 306, if an intercepted event bears no relation to a set of particular messages associated with restricted application operations, the intercepted event can be ignored. Otherwise, in block 308 the digital rights associated with the secured file can be retrieved and in block 310 the digital rights can be consulted to determine whether the event relates to a permissible action. If so, in block 314 the event can be passed to the default event handler of the authoring application. Otherwise, in block 312 the event can be quashed.

Importantly, the present invention is not limited in regard to the precise manner in which digital rights are enforced in a secured file. Rather, in accordance with the inventive arrangements, any suitable enforcement mechanism can suffice so long as the digital rights are enforced within the authoring application as opposed to their enforcement in an ancillary viewer. In particular, while in one aspect of the invention, the file security management application can sub-class merely the authoring application, in other embodiments, the file security management application can sub-class other related applications such as the clipboard in order to more securely enforce digital rights pertaining to clipboard operations.

The present invention can be realized in hardware, software, or a combination of hardware and software. A system for managing access to collaborative files which has been configured in accordance with the present invention can be realized in a centralized fashion in one computer system, or in a distributed fashion where different elements are spread across several interconnected computer systems. Any kind of computer system, or other apparatus adapted for carrying out the methods described herein, is suited.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A collaborative file rights management method comprising:
   identifying a file input/output (I/O) request to access a file, said file I/O request originating in an authoring application;
   quashing said file I/O request;
   automatically extracting digital rights management data appended to said file;
   providing said file to said authoring application; and
   managing access to said file in said authoring application based upon said extracted digital rights management data;
   wherein said quashing step comprises:
   posting a responsive message to said authoring application;
   intercepting an operating system event in said authoring application, said operating system event indicating receipt of said responsive message; and,
   suppressing further processing of said intercepted operating system event by the authoring application in the case when said responsive message is an "access denied" message.

2. The method of claim 1, further comprising:
   decrypting said file.

3. The method of claim 1, wherein said extracting step further comprises:
   determining environmental data associated with said file I/O request, said environmental data comprising at least one of a requestor's identity, a requestor's class, a requestor's computing domain, a requestor's location, a password, a time of day, and a date; and,
   extracting an access policy appended to said file.

4. The method of claim 3, wherein said providing step comprises:
   comparing said access policy to at least a portion of said environmental data;
   authenticating said file I/O request based upon said comparison; and,
   providing said file to said authoring application only if said file I/O request has been authenticated.

5. The method of claim 1, wherein said identifying step comprises:
   monitoring kernel-level file I/O requests contained in I/O request packets processed in a file system manager; and,
   detecting said file I/O request to access said file in one of said I/O request packets.

6. The method of claim 1, wherein said management step comprises:
   intercepting operating system messages in said authoring application;
   detecting among said intercepted operating system messages, operating system messages directed to authoring application operations which can be limited according to digital rights specified in said extracted digital rights management data; and,
   quashing said detected events where said digital rights management data prohibits execution of said authoring application operations.

7. The method of claim 6, wherein said authoring application operations comprise operations selected from the group consisting of clipboard operations, printing operations, file saving operations, and file editing operations.

8. A collaborative file rights management system comprising:
   a file security filter driver configured to identify file input/output (I/O) requests received in a kernel-layer file system manager to open an encrypted file in said authoring application;
   said file security filter driver configured to quash said file I/O requests, decrypt said encrypted file and provide said decrypted file and a responsive message to said authoring application; and
   a file security management application configured to intercept operating system events directed to an authoring application, said intercepted operating system events indicating receipt of a responsive message;
   said file security management application configured to extract digital rights management data appended to said encrypted file, detect operating system events directed to authoring application operations which can be limited according to digital rights specified in said extracted digital rights management data, and suppress further processing of said detected operating system event in the cases when the responsive message is an "access denied" message, or where said digital rights management data prohibits execution of said authoring application operations.

9. A machine readable storage having stored thereon a computer program for managing digital rights in a collaborative file, said computer program comprising a routine set of instructions for causing the machine to perform the steps of:
   identifying a file input/output (I/O) request to access a file, said file I/O request originating in an authoring application;
   quashing said file I/O request;
   automatically extracting digital rights management data appended to said file;
   providing said file to said authoring application; and
   managing access to said file in said authoring application based upon said extracted digital rights management data;
wherein said quashing step comprises:
   posting a responsive message to said authoring application;
   intercepting an operating system event in said authoring application, said operating system event indicating receipt of said responsive message; and,
   suppressing further processing of said intercepted operating system event by the authoring application in the case when said responsive message is an "access denied" message.

10. The machine readable storage of claim 9, further comprising:
   decrypting said file.

11. The machine readable storage of claim 9, wherein said extracting step further comprises:
   determining environmental data associated with said file I/O request, said environmental data comprising at least one of a requestor's identity, a requestor's class, a requestor's computing domain, a requestor's location, a password, a time of day, and a date; and,
   extracting an access policy appended to said file.

12. The machine readable storage of claim 11, wherein said providing step comprises:
   comparing said access policy to at least a portion of said environmental data;
   authenticating said file I/O request based upon said comparison; and,
   providing said file to said authoring application only if said file I/O request has been authenticated.

13. The machine readable storage of claim 9, wherein said identifying step comprises:
   monitoring kernel-level file I/O requests contained in I/O request packets processed in a file system manager; and,
   detecting said file I/O request to access said file in one of said I/O request packets.

14. The machine readable storage of claim 9, wherein said management step comprises:
   intercepting operating system messages in said authoring application;
   detecting among said intercepted operating system messages, operating system messages directed to authoring application operations which can be limited according to digital rights specified in said extracted digital rights management data; and,
   quashing said detected events where said digital rights management data prohibits execution of said authoring application operations.

15. The machine readable storage of claim 14, wherein said authoring application operations comprise operations selected from the group consisting of clipboard operations, printing operations, file saving operations, and file editing operations.

* * * * *